J. T. SMITHER.
WAGON BODY.
APPLICATION FILED APR. 16, 1908.
912,430.
Patented Feb. 16, 1909.
2 SHEETS—SHEET 1.
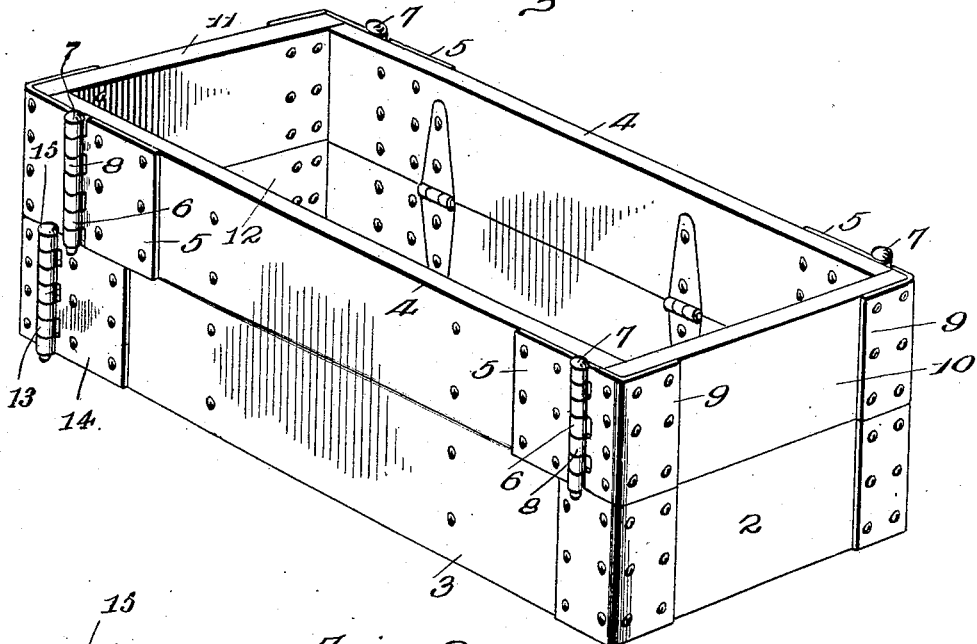
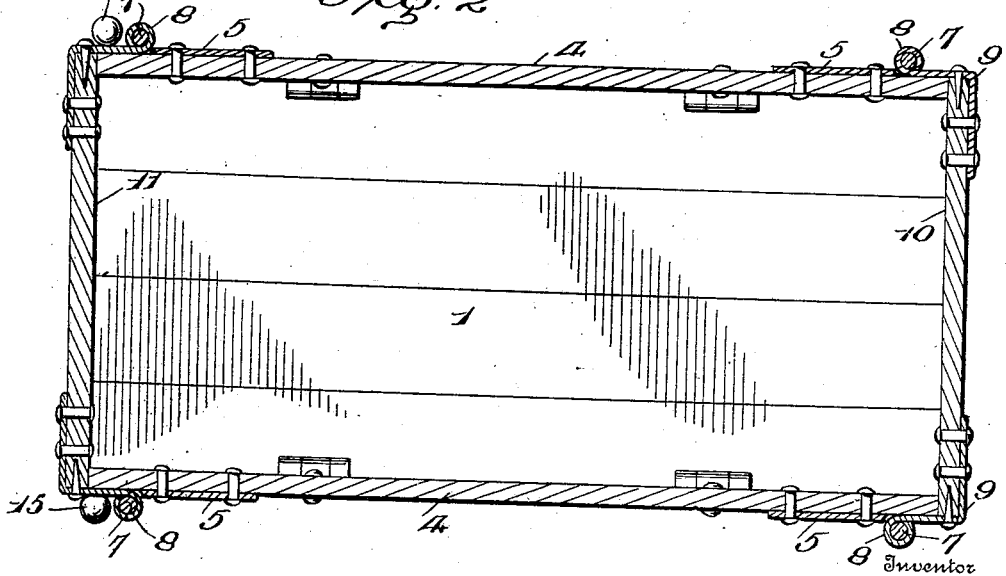
Witnesses
Inventor
J. T. Smither.
By
R. H. A. Lacey, Attorneys J. T. SMITHER.
WAGON BODY.
APPLICATION FILED APR. 16, 1908.
912,430.
Patented Feb. 16, 1909.
2 SHEETS—SHEET 2.
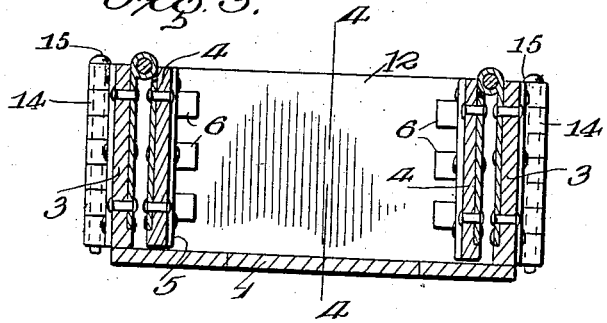
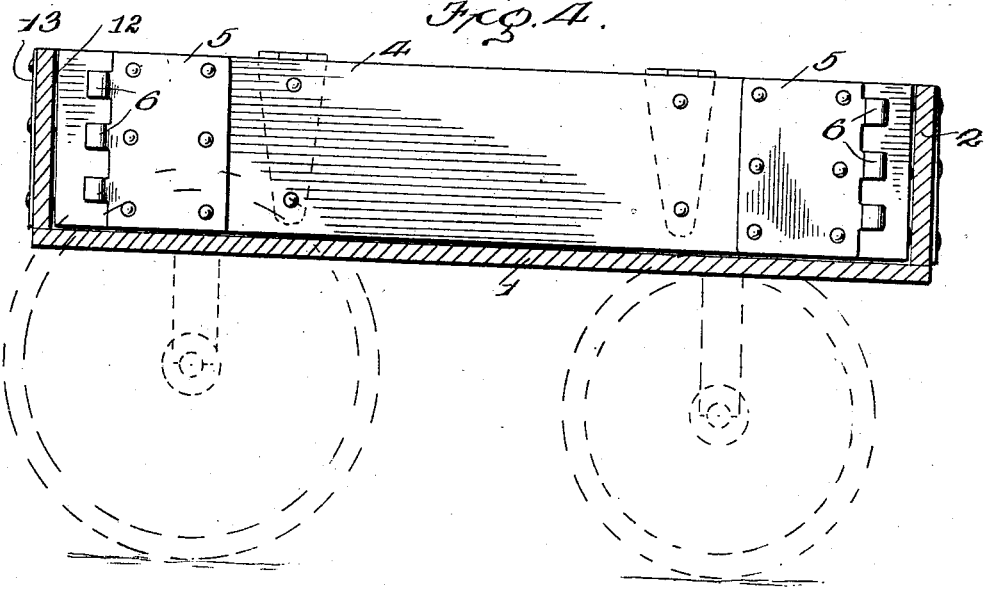
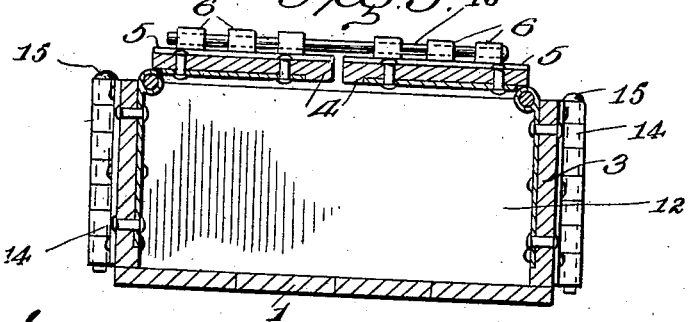
Witnesses
Inventor
J. T. Smither.
By
Attorneys

UNITED STATES PATENT OFFICE.

JOHN T. SMITHER, OF MORGADORE, KENTUCKY.

WAGON-BODY.

No. 912,430.          Specification of Letters Patent.          Patented Feb. 16, 1909.

Application filed April 16, 1908. Serial No. 427,458.

*To all whom it may concern:*

Be it known that I, JOHN T. SMITHER, citizen of the United States, residing at Morgadore, in the county of Owen and State of Kentucky, have invented certain new and useful Improvements in Wagon-Bodies, of which the following is a specification.

The object of this invention is an improved construction of wagon body the parts of which are so arranged that the sides and ends may be extended whenever desired, the side boards being so arranged with respect to the relatively stationary sides that they may be formed in one position as a cover for the wagon bed.

The invention consists in certain constructions, arrangements and combination of the parts that I shall hereinafter fully describe and claim.

For a full understanding of the invention, reference is to be had to the following description and accompanying drawings in which:

Figure 1 is a perspective view of a wagon body constructed in accordance with my invention; Fig. 2 is a horizontal section thereof; Fig. 3 is a transverse sectional view; Fig. 4 is a longitudinal section on the line 4—4 of Fig. 3, the side board being shown in a swung-down position; and Fig. 5 is a transverse sectional view showing the side boards arranged to form a cover for the bed.

Corresponding and like parts are referred to in the following description and indicated in all the views of the drawings by the same reference characters.

Referring to the drawings, the numeral 1 designates the bottom or bed of my improved wagon body, 2 the relatively stationary front, and, 3 the relatively stationary sides. 4 designates the side boards that are hinged to the upper edges of the permanent sides 3 to fold downwardly within the wagon body when they are not desired for use or to assume a vertical position in order to extend the sides and thereby increase the capacity of the body.

The side boards 4 are provided at their ends with hinges 5 that are formed with a series of spaced knuckles 6 designed to receive the pintles 7. The pintles 7 are adapted to be inserted also in corresponding knuckles 8 of the hinges 9 that are secured to the front and rear extension end gates designated 10 and 11 respectively, so as to secure the two extension sides or side boards 4 to said parts 10 and 11.

12 designates the main or lower end gate which is provided at both ends with hinges 13, said hinges being formed with knuckles designed to alternate with corresponding knuckles in hinges 14 secured to the permanent or relatively stationary sides 3 at the rear ends thereof. Pintles 15 are adapted to be inserted through the knuckles of the hinges 13 and 14 so as to secure the main or lower end gate 12 in place, it being obvious that by the removal of etiher one of the two pintles 15, the end gate may be swung out to open position, instead of slipping the end gate upwardly as is ordinarily the case. It is also, obvious that the entire end gate may be removed if desired.

From the foregoing description in connection with the accompanying drawings, it will be seen that I have provided a very simple, durable and efficient construction of wagon body in which the side boards 4, as they are hinged to the relatively stationary sides 3, may be folded downwardly and inwardly within the wagon body, in which position they manifestly reinforce the sides, and that said side boards may be swung up to a vertical position and secured to the extension end gates 10 and 11 to increase the capacity of the wagon body whenever desired.

It will also be understood that the side boards 4 may be conveniently arranged to form a cover for the wagon bed merely by swinging the side boards inwardly towards each other and holding them in a horizontal plane by means of rods 16 extending across the front and rear ends of the side boards and passing through the knuckles of the hinges.

Having thus described the invention, what is claimed as new is;

1. A wagon body, comprising a bed, sides, side boards hinged to the upper edges of the sides and adapted to fold inwardly thereon, said side boards being provided at their ends with hinge plates said plates being provided with knuckles, and extension front and rear ends formed with knuckles adapted to co-act with the knuckles of the side boards and pintles adapted to pass through the co-acting knuckles whereby to hold the side boards and extension ends together in vertical position.

2. A wagon body, comprising a bed, sides secured to said bed, side boards hinged to the sides, hinge plates secured to the ends of the side boards and formed with knuckles and rods adapted to be inserted through said knuckles to hold the side boards in horizontal position as a cover for the bed.

3. A wagon body, comprising a bed and sides, side boards hinged to the upper edges of the sides, said side boards being provided at their ends with plates, said plates being formed with knuckles, extension front and rear ends formed with knuckles adapted to co-act with the knuckles of the side boards to receive pintles whereby to hold the side boards and ends together in vertical position and pintles for said knuckles.

In testimony whereof I affix my signature in presence of two witnesses.

JOHN T. SMITHER. [L. S.]

Witnesses:
C. A. KEMPER,
IRA J. KEMPER.